United States Patent [19]

Garabedian et al.

[11] Patent Number: 4,737,338

[45] Date of Patent: Apr. 12, 1988

[54] NUCLEAR REACTOR CONTAINING CONNECTING MEANS FOR CONNECTING A REACTOR VESSEL AND AT LEAST ONE RECEIVER VESSEL

[75] Inventors: George Garabedian, Boston; Robert A. DeLuca, Newton Centre, both of Mass.

[73] Assignee: Stone & Webster Engineering Corp., Boston, Mass.

[21] Appl. No.: 860,552

[22] Filed: May 7, 1986

[51] Int. Cl.$^4$ .................. G21C 19/28; G21C 17/00
[52] U.S. Cl. .................. 376/402; 376/203; 376/250; 376/258; 376/286; 376/290; 376/291; 376/292
[58] Field of Search .......... 376/203, 204, 247, 250, 376/264, 285, 286, 290, 291, 292, 403, 402, 258

[56] References Cited

U.S. PATENT DOCUMENTS

| | | | |
|---|---|---|---|
| 3,242,981 | 3/1966 | Hutchinson et al. | 376/403 |
| 3,425,907 | 2/1969 | Bonsel et al. | 376/403 |
| 3,488,067 | 1/1970 | Sommer | 376/291 |
| 3,525,669 | 8/1970 | Germer | 376/291 |
| 3,756,914 | 9/1973 | Whittaker | 376/264 |
| 3,793,143 | 2/1974 | Muller | 376/285 |
| 3,830,290 | 8/1974 | Thamasett et al. | 376/250 |
| 4,056,435 | 11/1977 | Carlier et al. | 376/264 |
| 4,069,101 | 1/1978 | Manjus | 376/403 |
| 4,069,766 | 1/1978 | Bernstein | 376/264 |
| 4,280,873 | 7/1981 | Hahn | 376/286 |
| 4,450,134 | 5/1984 | Soot et al. | 376/203 |
| 4,470,946 | 9/1984 | Vassalotti et al. | 376/250 |
| 4,495,137 | 1/1985 | Otsubo | 376/250 |

FOREIGN PATENT DOCUMENTS

| | | | |
|---|---|---|---|
| 503945 | 4/1971 | Switzerland | 376/286 |
| 2090042 | 6/1982 | United Kingdom | 376/290 |

Primary Examiner—Deborah L. Kyle
Assistant Examiner—Richard L. Klein
Attorney, Agent, or Firm—Hedman, Gibson, Costigan & Hoare

[57] ABSTRACT

Disclosed is a nuclear reactor employing a liquid metal and containing a reactor vessel, and at least one satellite vessel, and a hot and a cold leg connecting means which combine to form a continuous pathway for the flow of the liquid metal between the reactor vessel and the at least one satellite vessel. Each of the hot leg and cold leg connecting means contain a bellows assembly which are readily accessible for repair or replacement without draining the reactor vessel of the liquid metal.

24 Claims, 6 Drawing Sheets

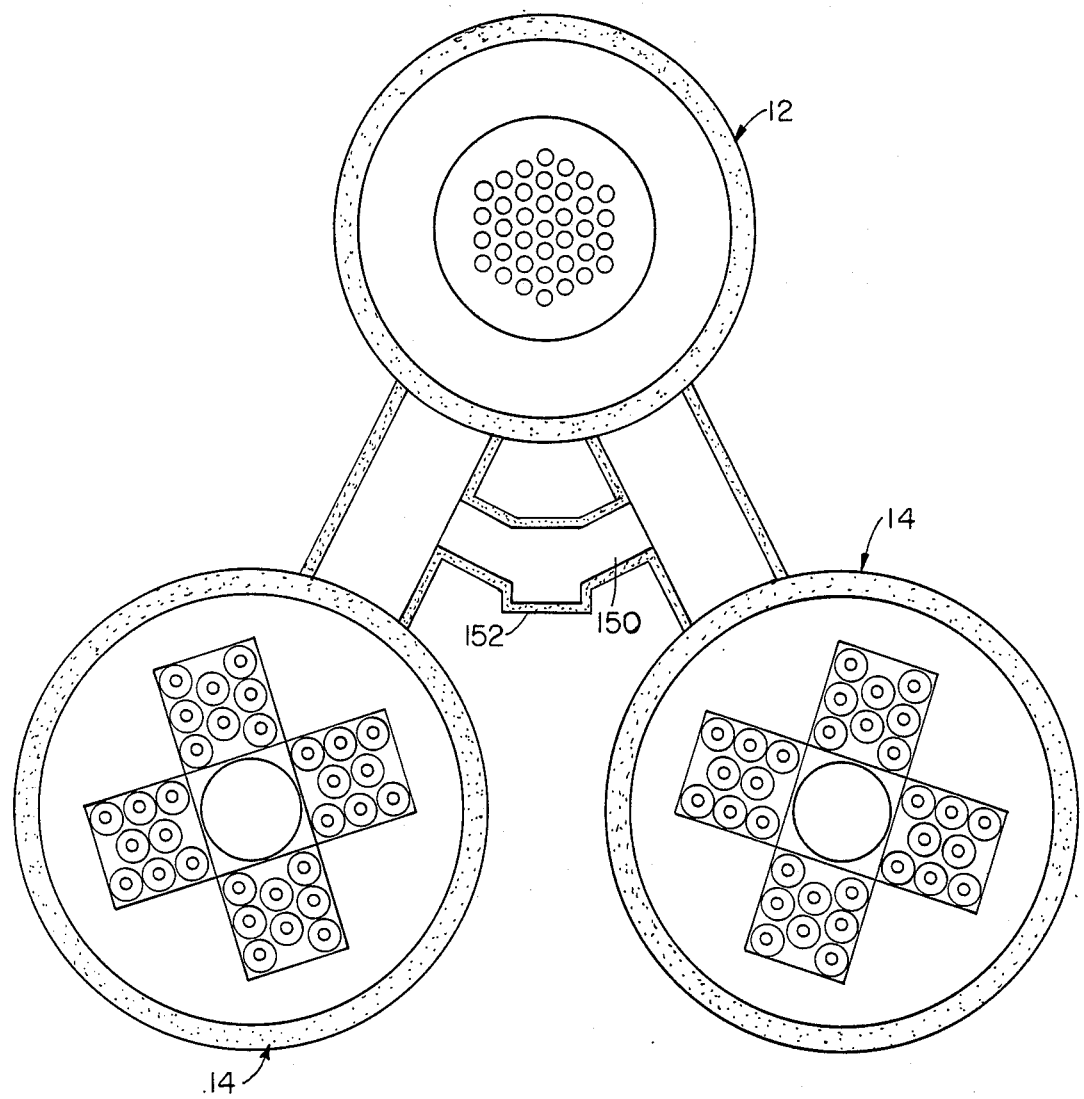
F I G. 6

NUCLEAR REACTOR CONTAINING CONNECTING MEANS FOR CONNECTING A REACTOR VESSEL AND AT LEAST ONE RECEIVER VESSEL

FIELD OF THE INVENTION

The present invention is directed to a nuclear reactor which employs a reactor vessel connected to at least one receiver vessel and specifically to apparatus for providing for the flow of hot and cool liquid metal (e.g. sodium) between the vessels which apparatus contains expansion bellows which can be repaired or replaced without draining all of the liquid metal from the nuclear reactor facility.

BACKGROUND OF THE INVENTION

Some nuclear reactor facilities utilize a liquid metal, such as sodium, as the primary coolant fluid. Such a reactor design has a low pressure and operates at high temperatures. One such nuclear reactor, the so-called "loop type" reactor employs a reactor vessel having a series of looped pipes to provide a path for the flow of hot liquid sodium discharged from the reactor. The hot sodium is sent to heat exchangers which cool the sodium prior to its return to the reactor vessel.

Hot sodium (about 950°-985° F.) causes significant thermal expansion of metal piping. In the loop type reactor the hot radioactive sodium flows through a series of expandable metal loops. The primary disadvantage of a loop type system is cost and maintenance difficulties associated with the large piping systems, supports, trace heating, cell liner systems, and reinforced concrete structures for housing the piping. In addition, the sodium piping exiting the reactor vessel can impose severe transients in the nozzle area which are difficult to accomodate when designing a loop type sodium cooled nuclear reactor facility.

To overcome the disadvantages of using the loop type sodium reactor, there has been developed a reactor facility containing a reactor vessel and at least one satellite vessel which houses the primary heat transport system (e.g. heat exchangers and pumps) and which includes non-looped connecting pipes between the respective vessels. Due to temperature transients arising from the flow of the sodium, the connecting pipes have been provided with expansion bellows.

Such systems typically employ a connecting pipe which enables the hot sodium to flow from the hot plenum of the reactor vessel to the satellite vessel ("the hot leg") and a connecting pipe ("the cold leg") for returning cool sodium from the satellite vessel to the reactor vessel.

The bellows employed in such systems may have to be replaced or repaired because of thermal stress or corrosion which is caused by plant operations or by a faulty bellows unit. Heretofore replacement and repair of the bellows necessitated shutting down the reactor facility and draining the liquid sodium from the reactor and satellite vessels into a storage facility which significantly adds to the cost of supplying nuclear power. The use of valves is also undesirable because they are costly, unreliable and present system design complications.

Usually, a sodium cooled reactor facility is equipped with several storage tanks for storing sodium drained from the reactor facility. However, the use of several storage tanks to house the drained sodium and the need to remove the fuel from the reactor vessel significantly adds to the cost of the operation. It is therefore desirable to devise a reactor facility requiring fewer storage tanks, preferably only a single storage tank, to make repairs within the reactor facility, and which does not require the removal of fuel from the reactor vessel.

The present invention was developed to overcome the problems associated with previous bellows equipped connecting pipes in reactor facilities employing a reactor vessel and at least one satellite vessel to thereby enable easier access to the bellows and to minimize the number of storage tanks. The invention employs non-looped connecting pipes for the flow of hot and cool liquid metal such as sodium between the reactor and the satellite vessels which includes an expanded section containing the bellows assembly.

The bellows assembly used in the present invention allows the connecting pipes to expand and contract with minimal temperature or pressure transients. This is because the connecting pipes are designed to minimize temperature and pressure transients in the vicinity of the openings thereof and the bellows. Furthermore, means are provided for enabling the bellows to be removed for repair or replacement without having to drain the reactor vessel of liquid metal, and thus only a single storage tank is necessary and this is an important factor in reducing the cost of constructing and maintaining the reactor facility.

Still further, the present invention allows several satellite vessels to be directly and closely connected to the reactor vessel at any time durng the lifetime of the facility. That is, at least partial installation of the non-loop connecting pipes may be undertaken during the initial construction phase of the facility. This is desirable if the facility will ultimately operate with several satellite vessels but initially a smaller number of satellite vessels are to be installed and operated.

For example, if a reactor vessel is capable of a 1000 Mwe power level using four satellite vessels, it may be desirable to initially operate the facility at 500 Mwe using two satellite vessels. By providing connecting pipes for four satellite vessels in the initial construction of the reactor facility, the last two satellite vessels may be hooked up in the minimum amount of time without the need for draining liquid metal from the reactor and existing satellite vessels. This can be done by sealing the openings of the connecting pipes which are not to be used initially and then removing the seals when the additional satellite vessels are installed.

SUMMARY OF THE INVENTION

The present invention is directed to a nuclear reactor which includes a reactor vessel, at least one receiver vessel and means for connecting the reactor vessel and the at least one receiver vessel, the connecting means comprising a hot leg connecting means for providing a flow path for hot liquid metal (e.g. sodium) from the reactor vessel to the receiver vessel and a cold leg connecting means for providing a flow path for the cool liquid metal coming from the receiver vessel to the reactor vessel. Sodium will be referred to hereinafter as exemplary of liquid metals which may be employed. Each of the hot leg and cold leg connecting means is provided with at least one double bellows assembly to allow for expansion of the vessels and connecting means. Access is provided to the hot leg and cold leg connecting means to permit removal and repair or replacement of the bellows assembly.

As used herein the term "receiver vessel" includes any one or more of the following; a satellite vessel, a heat exchanger, a steam generator, a pump and the like. For convenience, the remainder of the application will refer to the use of a satellite vessel as exemplary of a receiver vessel.

In accordance with the present invention, a pathway for the flow of sodium is provided from the reactor vessel to the satellite vessel so that heat absorbed from the reactor core is dissipated in heat exchangers or steam generators located in the satellite vessel.

The hot leg connecting means comprises a conduit having respective openings leading into the reactor vessel and the satellite vessel to provide a pathway for the flow of hot sodium generated in the reactor vessel. The conduit is comprised of an inner sleeve through which the bulk of hot sodium flows and an outer sleeve, circumscribing the inner sleeve, which houses the hot leg connecting means bellows assembly. The end of the connecting means in proximity to the reactor vessel is permanently attached to the reactor vessel via a housing and a shroud support which also serves to protect the end of the connecting means from temperature fluctuations which can cause excessive thermal stress. The end in proximity to the satellite vessel is also protected by a housing and support but is free to move in response to the expansion and contraction of the bellows assembly.

A chamber containing stagnant sodium is positioned between the inner and outer sleeves of the conduit which serves to minimize temperature transients in the region of the bellows assembly. The upper portion of the chamber may be lined with an insulation layer customarily used in conjunction with hot liquid metals. The present invention enables the bellows assembly to be maintained at a temperature below the operating temperature of the hot primary sodium flow (i.e. below about 950° F.).

The bellows assembly is positioned above the stagnant sodium containing chamber and about midway along the length of the hot leg connecting means. This arrangement protects the bellows from rapid temperature transients. In a preferred form of the invention the insulation layer lining the stagnant sodium containing chamber can further reduce the effects of temperature fluctuations near the bellows and keep the temperature below the point at which metal fatigue occurs (i.e. below 800° F.).

The bellows assembly used for the hot leg connecting means is of the ASME Code Section III, Class I type (See "Metallic Bellows and Expansion Joints" R. I. Jetter et al. ASME—Pressure Vessels & Piping Division, Vol. 51, pp. 1–9, incorporated herein by reference). That is, the bellows assembly is comprised of pairs of bellows, each bellow being in the form of a sinusoidal shaped metal sheet which may be made of stainless steel or other suitable metals or alloys thereof. The bellows expand when exposed to hot sodium which causes the inner sleeve of the hot leg connecting means to move laterally in the direction of the satellite vessel. More than one pair of bellows may be used to accommdate any discontinuity in the vertical growth of the area where the connecting means opens into the reactor and satellite vessels, respectively.

The hot sodium generated in and about the core of the reactor vessel flows into and through one of the openings of the hot leg connecting means. The heat of the flowing hot sodium is transmitted to the stagnant sodium in the chamber lying just above the inner sleeve of the hot leg connecting means. The bellows and inner sleeve expand in response to the temperature increase.

The cold leg connecting means is located between the lower portions of the reactor and satellite vessels and below and essentially parallel to the hot leg connecting means to provide a pathway for the passage of cool sodium from the lower portion of the satellite vessel to the lower portion of the reactor vessel. The cool sodium obtained from the lower portion of the satellite vessel moves through the cold leg connecting means where it is channeled into the reactor core to again take up heat generated by the nuclear reaction.

The cold leg connecting means comprises a conduit including an inner and outer sleeve as described above for the hot leg connecting means. The cold leg inner sleeve, however, also includes a nozzle-diffuser section extending into the satellite vessel. At the end of the diffuser section is an inductor assembly having a plurality of inlet holes. The inductor assembly preferably having the shape of a funnel is connected to a pump assembly within the satellite vessel to provide for the uptake of cool sodium from the lower portion of the satellite vessel.

The opening of the inner sleeve in proximity to the reactor vessel is connected to a reactor core inlet plenum sleeve to provide a pathway for the flow of cool sodium directly into the reactor core.

The inner sleeve of the cold leg connecting means is reversibly movable from a position within the cold leg connecting means to a position within the satellite vessel. The reversible movement may be accomplished by fitting the inner sleeve with a track on its bottom surface for engaging spaced apart rollers positioned on the bottom surface of the outer sleeve. This enables the inner sleeve to be moved into the satellite vessel to thereby expose the bellows assembly when repair or replacement is necessary. Alternatively, the rollers may be positioned on the bottom surface of the inner sleeve and the track on the bottom surface of the outer sleeve to accomplish the same purpose of providing lateral movement for the inner sleeve toward the satellite and back again into the cold leg connecting means.

Circumscribing the movable inner sleeve and running the length of the bottom portion of the cold leg connecting means is an auxiliary pathway for the flow of sodium between the lower portion of the satellite vessel and the lower plenum of the reactor vessel.

The cold leg connecting means also comprises at least one bellows assembly (ASME Section III, Class I) as described above for the hot leg connecting means.

Circumscribing the reactor facility including each of the hot leg and cold leg connecting means is a guard vessel comprising a guard pipe which is expandable via at least one single bellows assembly of the ASME Section III, Class II type. The guard vessel's primary purpose is to serve as a leak containment system such that if the radioactive liquid sodium escapes from the hot leg or cold leg connecting means it can be contained within the guard vessel to prevent escape into an unsecured environment. The guard vessel may be lined with insulation such as silica or the like on the upper surface of the guard pipe remote from the bellows assembly.

The guard pipe contains an inert gas to prevent against a sodium-oxygen chemical reaction in the event of a leak. The pressure of the inert gas can be monitored from remote locations to provide an early warning in the event that the integrity of the guard pipe is breached.

The area outside of the guard vessel is air cooled in order to keep the surrounding concrete walls below about 150° F. The air flow also serves to keep the guard vessel and guard pipe below the temperature of the hot leg connecting means to thereby provide a heat sink for the bellows assembly. The insulation on the upper surface of the guard pipe may be removed if necessary to assist in lowering the temperature in the vicinity of the bellows assembly to below 800° F. to help avoid metal fatigue.

The present invention also encompasses means for halting the flow of sodium in either or both the hot and cold leg connecting means to thereby enable access to the respective hot leg and cold leg bellows assemblies for repair or replacement. This is accomplished by having the openings of the inner sleeves of the hot leg and cold leg connecting means leading to the reactor vessel fitted with removable covers which are movable from an open position allowing the flow of sodium to a closed position shutting off the flow of sodium. The flow of sodium is cut off by the covers when it is desirable to empty the respective connecting means of sodium to gain access to the bellows assembly.

As a backup measure to insure against leakage of the hot sodium at the opening of the hot leg and cold leg connecting means in proximity to the reactor vessel, there is provided an auxillary cooling system which enables the temperature of the sodium in the vicinity of the closure to be reduced to below the melting point of sodium (i.e., below about 200° F.) to thereby form a leak preventing solid mass of sodium at the point of closure.

One of the features of the present invention is the relative ease by which the bellows assemblies may be removed for repair or replacement. More specifically, the reactor vessel does not have to be drained in order to effect repairs of the bellows. This is because the flow of sodium through the hot leg and cold leg connecting means can be halted by sealing the respective inner sleeves using the removable covers.

Furthermore, the bellows assemblies of both the hot leg and cold leg connecting means are positioned about midway between the reactor and satellite vessels. This is in marked contrast to previous systems which position the bellows assemblies at the ends of the connecting means within the satellite vessel. Bellows within the satellite vessel pose difficulties in replacement operations and may require removal of other satellite vessel components in order to provide access to the bellows.

The flow of sodium through the reactor facility containing the hot and cold leg connecting means of the present invention will now be described. The flow of sodium commences at the lower portion of the reactor vessel which contains cool sodium (e.g. about 670° F.). The sodium enters the reactor core and absorbs heat generated by the nuclear reaction. Since the core typically contains some non-fissionable material, the sodium may undergo uneven heating in the core region since only the fissionable material generates heat.

The unevenly heated sodium moves upward into the upper internal structure of the reactor vessel where the control rods are stored. The sodium is moved about in a random manner to insure that all of the sodium is brought to substantially the same temperature of about 985° F. The heated sodium then exits the upper internal structure into the hot plenum region of the reactor vessel. The opening between the reactor vessel and the hot leg connecting means (i.e. the reactor nozzle area) is protected from sodium temperature variations arising from power or flow fluctuations by means of the housing and shroud support.

The heated sodium enters the hot leg connecting means from the hot plenum region and flows toward the satellite vessel because the level of sodium in the satellite vessel is below the level of sodium in the reactor vessel. While in the hot leg, the heat from the hot sodium is transferred from the inner sleeve to the chamber containing stagnant sodium located between the inner and outer sleeves. Owing to the thermal expansion of the reactor and satellite vessels and the piping comprising the hot leg connecting means, the bellows of the hot leg connecting means is forced to expand. The inner sleeve freely expands laterally towards the satellite vessel since it is fixed only at the reactor vessel nozzle area.

The heated sodium exits the hot leg connecting means and enters into the upper region of the satellite vessel where it moves by gravity to the inlet holes of the heat exchanger or steam generator. The sodium passes over fluid containing coils or other suitable heat absorbing means and gives off heat until the temperature of the sodium is reduced to about 670° F. The resulting cool sodium is then drawn into a pump column where it is pumped into the cold leg connecting means.

The pump column runs almost the full height of the satellite vessel and contains a pump assembly. The pump assembly draws the cool sodium upward through inlet holes in the base of the pump column and thereafter pumps the cool sodium under pressure into the opening of the inner sleeve of the cold leg connecting means. Additional sodium is drawn into the inner sleeve through inlet ports in the inductor assembly attached to the end of the inner sleeve of the cold leg.

When the pump column is operational, it creates a pressurized jet of sodium which creates low pressure and pulls cool sodium from the bottom of the satellite vessel into the inlet holes of the inductor assembly. The diffuser section of the inner sleeve which is adjacent the inductor assembly serves to reduce the speed of the jet spray of sodium as it leaves the inductor assembly so that a non-turbulent flow of sodium is sent into the reactor core.

The hot leg and cold leg connecting means of the present invention are designed to enable the removal of the bellows assembly without draining sodium from the reactor vessel. This is accomplished by first shutting down the reactor by inserting neutron absorbing control rods into the core and cooling the sodium to a maintenance temperature of between about 400° to 450° F.

The end of the inner sleeve of the hot leg connecting means opening into the reactor vessel is sealed by placing a removable cover over the opening. This prevents further hot sodium from flowing into the inner sleeve. The sodium level in the satelite vessel is lowered below the level of the hot leg connecting means which allows the residual hot sodium in the hot leg to empty into the satellite vessel. The bellows assembly is then exposed by removing the guard pipe over the bellows assembly area. Residual sodium in the bottom portion of the bellows assembly is drained by means of a drain valve.

The drained bellows assembly and the portion of the inner sleeve which lies proximate to the bellows assembly are cut and removed. A new sleeve portion and bellows assembly (or repaired bellows assembly) are inserted and the side of the new sleeve portion nearest the satellite vessel is welded to the existing sleeve.

Thereafter, the bellows assembly is moved toward the welded sleeve to make room for welding the other end of the new sleeve portion to the existing sleeve.

The bellows assembly is then welded in place followed by the guard pipe to thereby complete the replacement of the bellows assembly. The cover over the opening of the inner sleeve is then removed. The sodium level is reestablished in the satellite vessel and hot sodium again flows through the thus repaired hot leg connecting means when the control rods are removed from the reactor core and the nuclear reaction is reinstituted.

The bellows assembly employed for the guard vessel may also be removed, if necessary, at the same time as the hot leg and/or cold bellows assembly or by itself.

Replacement of the cold leg bellows assembly is accomplished by first disengaging the inner sleeve of the cold leg connecting means from the reactor core inlet plenum sleeve and then sealing the opening of the inner sleeve with the cover as described previously for the hot leg connecting means. The pump in the satellite vessel is lifted upwards towards the top of the satellite vessel and the satellite vessel is drained of sodium. This provides a sodium free area in the lower portion of the satellite vessel into which the cold leg connecting means may be moved to expose the bellows assembly. Thereafter the inner sleeve is moved into the vacated lower portion of the satellite vessel where it is stored until the bellows assembly has been replaced.

The bellows assembly is then removed and a new bellows assembly (or repaired bellows assembly) is welded in place as described above for the hot leg connecting means. The inner sleeve is then moved from its stored position in the satellite vessel to its original position within the cold leg connecting means. The pump column is then lowered to its original position and the satellite vessel is loaded with cool sodium which had been stored in a suitable storage tank. The cover sealing off the opening of the inner sleeve leading to the reactor vessel is removed and a sealed connection is made between the inner sleeve and the reactor core inlet plenum sleeve to again provide a pathway for the flow of cool sodium directly to the core.

Access to the hot leg and/or cold leg bellows assemblies is provided by a passageway positioned between the reactor vessel and the satellite vessel. The passageway is of sufficient size to permit access for personnel and equipment to remove and repair or replace the bellows assembly.

BRIEF DESCRIPTION OF THE DRAWINGS

The following is a detailed description together with accompanying drawings of illustrative embodiments of the invention. It is to be understood that the invention is capable of modification and variation apparent to those skilled in the art within the spirit and scope of the invention.

FIG. 6 is a diagramatic view of a reactor vessel and two satellite vessels showing access to the respective hot leg and cold leg connecting means of the invention for removal of the bellows assemblies.

DETAILED DESCRIPTION OF THE INVENTION

Figure 1:
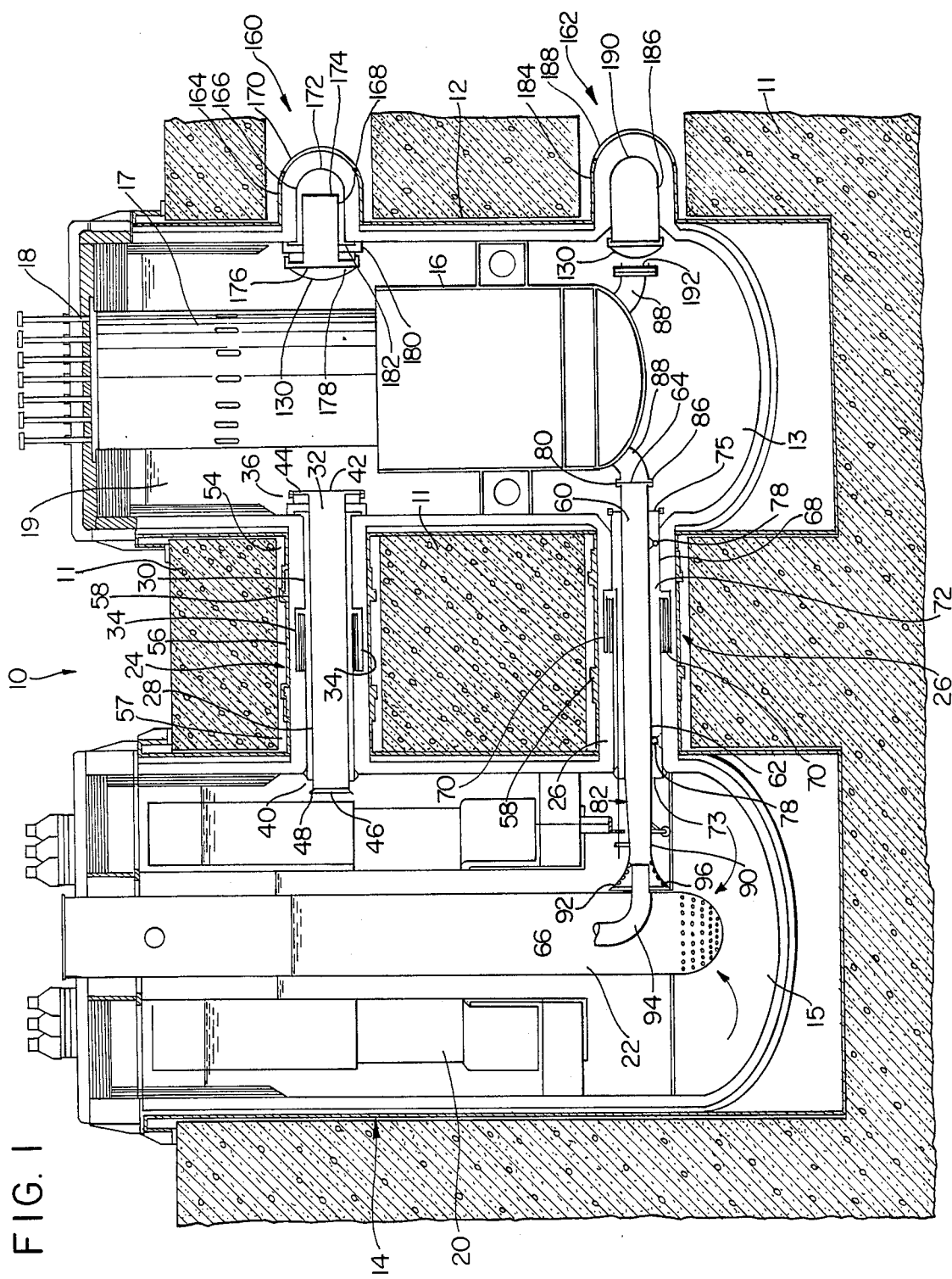
FIG. 1 is a cross-sectional view of a sodium nuclear reactor of the present invention showing the connection of a single reactor vessel and a single satellite vessel through a hot leg and a cold leg connecting means, and a sealed area in the reactor vessel for future installation of an additional satellite vessel.

Referring to the drawings and more specifically to the preferred embodiment of the invention shown in FIG. 1, a sodium cooled nuclear reactor 10 surrounded by a concrete wall 11 includes a reactor vessel 12 and a satellite vessel 14. More than one satellite vessel 14 may be connected to a single reactor vessel 12 as described hereinafter. The reactor vessel 12 includes a reactor core 16 containing fissionable material and a control rod storage area 17 containing control rods 18 within the hot plenum region 19 of the reactor vessel 12. The satellite vessel 14 includes a heat exchanger 20 which may also function as a steam generator, and a pump column 22. A hot leg connecting means 24 and a cold leg connecting means 26 provide a connection between the reactor vessel 12 and the satellite vessel 14 for the flow of sodium between the vessels.

The hot leg connecting means 24 includes an inner sleeve 28 and an outer sleeve 30. The inner sleeve provides a pathway 32 through which hot sodium flows from the hot plenum region 19 of the reactor vessel 12 to the satellite vessel 14. The outer sleeve 30 substantially circumscribes the inner sleeve 28 and houses a double bellows assembly 34 of the ASME Section III Class I type as more specifically shown in FIG. 2.

Figure 4:
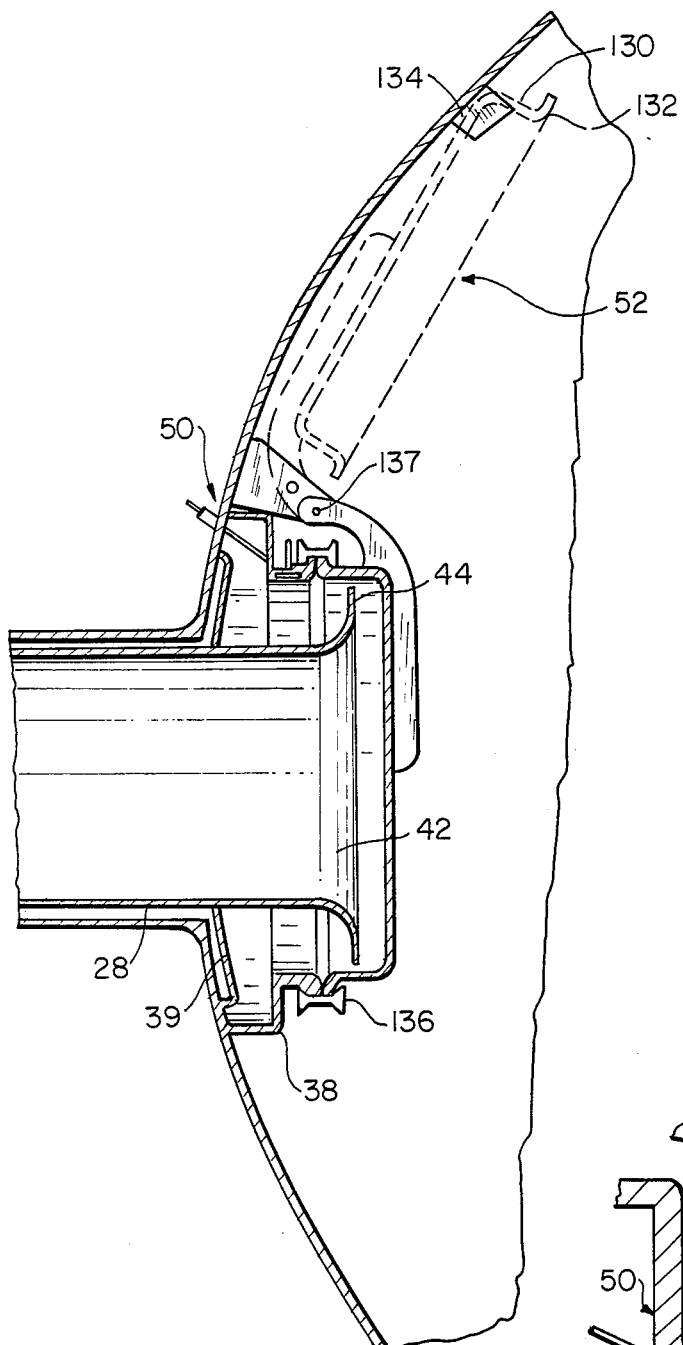
FIG. 4 is a plan view of the opening of the hot leg connecting means leading into the reactor vessel showing the removable cover and auxiliary cooling system.

The hot leg connecting means 24 is permanently affixed at an end portion 36 lying within the reactor vessel 12 by housing 38 and shroud support 39 shown specifically in FIG. 4. The housing 38 and shroud support 39 also provide protection for the vessel nozzle penetration area against temperature fluctuations generated within the hot plenum region 19.

Figure 4A:
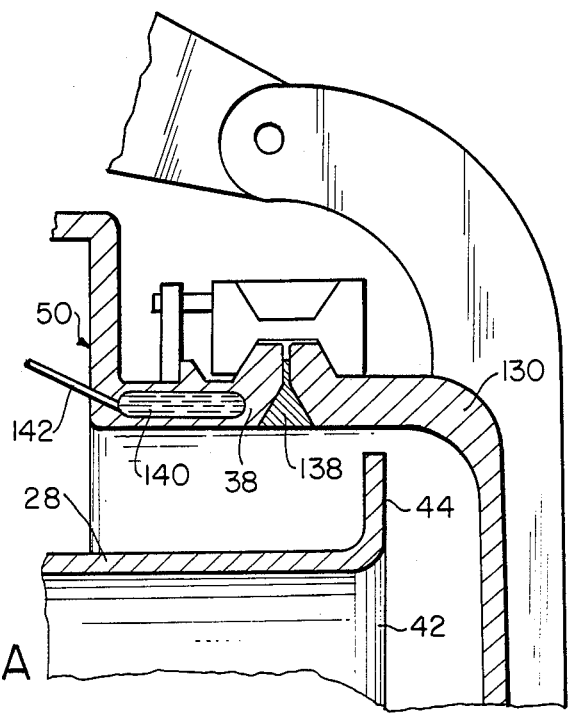
FIG. 4A is an expanded plan view of the auxillary cooling system shown in FIG. 4.
Figure 5:
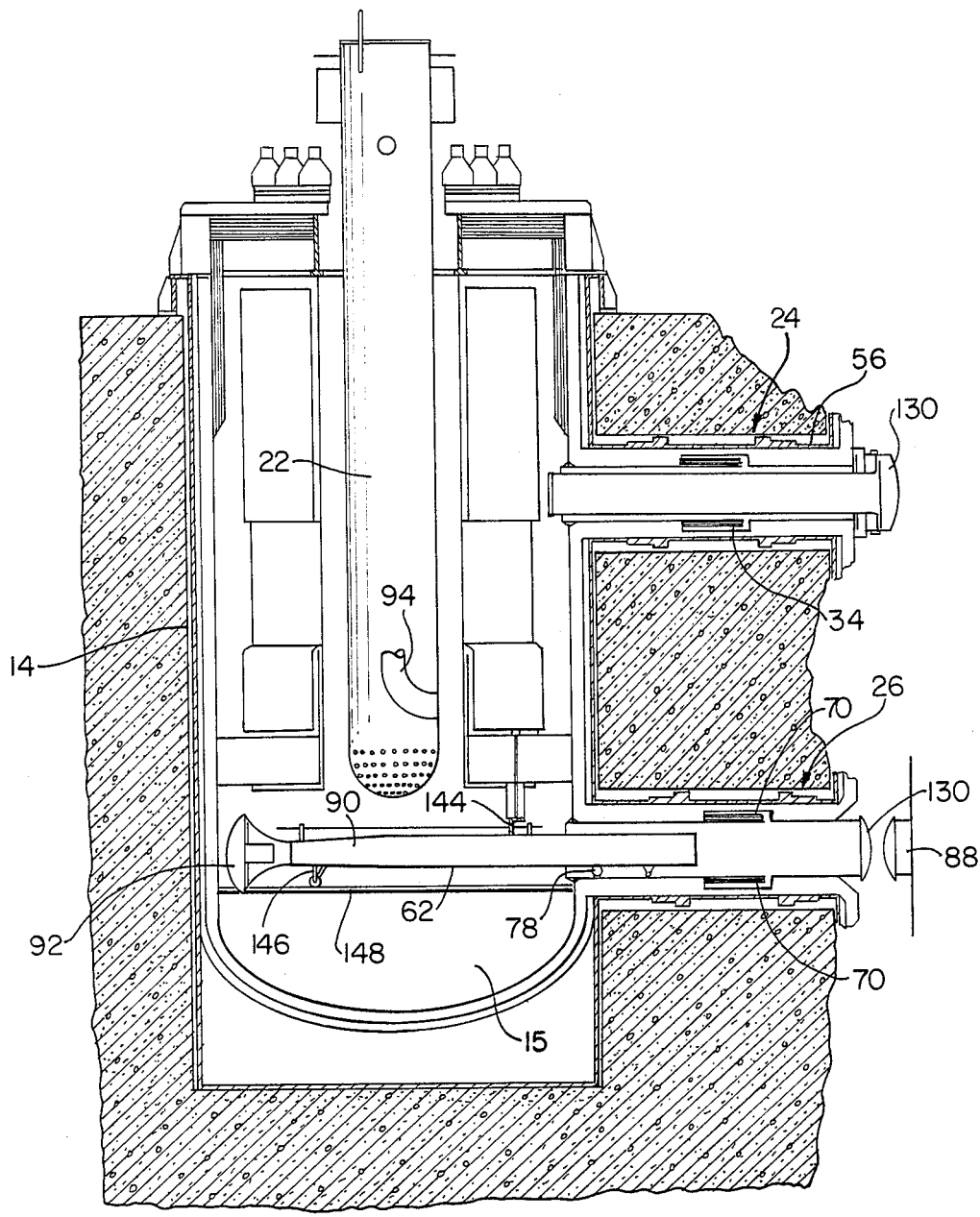
FIG. 5 is a cross-sectional view of the satellite vessel and hot leg and cold leg connecting means of the invention in position for removing the respective bellows assemblies.

The end portion 36 includes an entry port 42 having a rim 44 opening into the hot plenum region 19 of the reactor vessel 12. The entry port 42 has associated therewith an auxillary cooling means 50 as shown in FIG. 4A and a sealing means 52 as shown in FIG. 4.

The opposed end portion 40 which lies within the satellite vessel 14 is free to move laterally in response to the thermal growth of the inner sleeve 28 and the movements of the double bellows assembly 34 as described hereinafter. The end portion 40 includes an exit port 46 having a rim 48 opening into satellite vessel 14.

Figure 2:
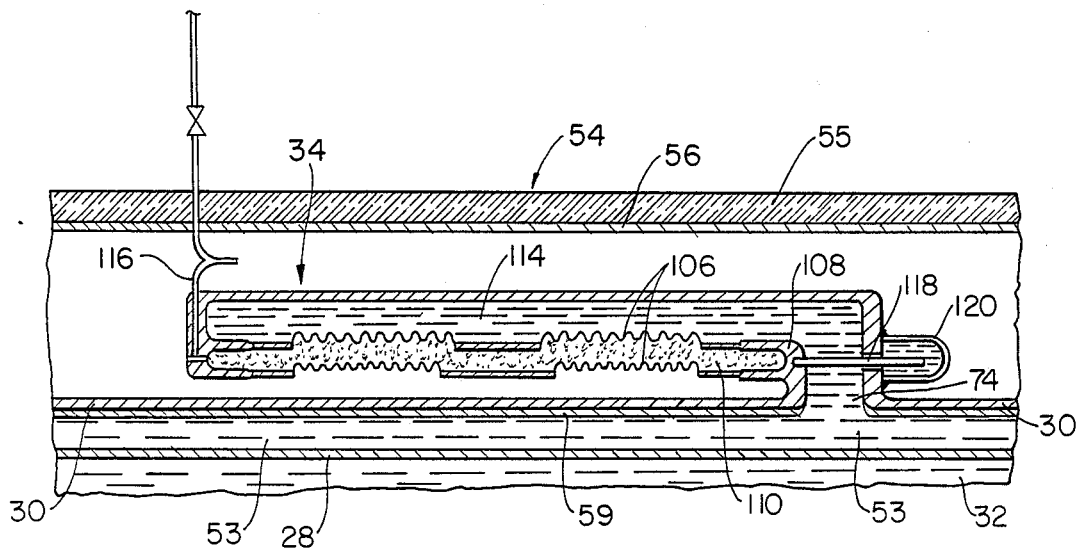
FIG. 2 is a perspective view showing the bellows assembly employed for the hot leg and cold leg connecting means.

Referring to FIG. 2, between the outer sleeve 30 and the inner sleeve 28, there is provided a chamber 53 just below the bellows assembly 34. The chamber 53 contains stagnant sodium which minimizes temperature transients in the vicinity of the bellows assembly 34. The hot sodium flowing through the pathway 32 of the inner sleeve 28 causes the temperature of the inner sleeve 28 to rise. The chamber 53 containing the stagnant sodium absorbs heat given off by the inner sleeve 28. The stagnant sodium transfers heat to the outer sleeve 30 and the bellows assembly 34. Expansion of the outer sleeve 30 due to thermal growth of the reactor 12 and satellite vessel 14 as well as the heating of the outer sleeve 30 itself as a result of the heat given off by the hot sodium causes the bellows assembly 34 to expand. Vertical, horizontal and sideway movements of the reactor vessel 12, satellite vessel 14 and associated piping are accomodated by means of the bellows assembly 34. If desired, temperature transients in the vicinity of the bellows assembly may be reduced by employing an insulation layer 59 on the bottom surface of the outer sleeve 30. The insulation layer 59 may be a solid metallic layer or air space formed by layers of metal or the like.

Above and running along the length of the outer sleeve 30 of the hot leg connecting means 24 is a guard vessel 54 containing a guard pipe 56 which functions as a containment system by taking up any radioactive sodium which leaks from the hot leg connecting means 24. As shown in FIG. 2, the upper surface of the guard pipe 56 may be lined with insulation 55 made of silica or other suitable material. As shown more specifically in FIG. 3, the guard vessel 54 includes the guard pipe 56 which contains an inert gas (e.g., argon) and at least one bellows assembly 58 of the ASME Section III Class II type. Lying outside of the guard vessel 54 is a pathway 57 (shown in FIG. 1) providing for the flow of air to cool the guard vessel 54 and thereby maintain the temperature of the surrounding concrete walls 11 below about 150° F.

Referring to FIG. 1, the cold leg connecting means 26 is located below and substantially parallel to the hot leg connecting means 24 and provides a pathway 60 for the flow of cool sodium from the lower portion 15 of the satellite vessel 14 to the bottom plenum 13 of the reactor vessel 12.

The cold leg connecting means includes an inner sleeve 62 having an exit port 64 opening into the reactor vessel 12. Specifically,, the exit port 64 provides a sealed connection with the core inlet plenum sleeve 88 to provide for a continuous flow of cool sodium to the reactor core 16. The inner sleeve 62 also has an entry port 66 opening into the satellite vessel 14. Specifically, the inner sleeve 62 is connected to a pump column sleeve 94 to provide for a continuous flow of cool sodium between the satellite vessel 14 and the cold leg connecting means 26.

An outer sleeve 68 circumscribes the inner sleeve 62 and contains at least one bellows assembly 70 identical to that used in the hot leg connecting means 24 (i.e. ASME Section III Class I).

Between the inner sleeve 62 and the outer sleeve 68 there is provided an auxillary pathway 72 through which cool sodium may flow from the satellite vessel 14 to the reactor vessel 12 or vice versa. The pathway 72 is provided as a means of hydraulically interconnecting the satellite vessel 14 with other satellite vessels through the common bottom plenum 13 within the reactor vessel 12. For flow from the satellite vessel 14 to the bottom plenum 13, the cold sodium in the lower portion 15 of the satellite vessel 14 enters the pathway 72 through an auxillary entry port 73 and exits into the bottom plenum 13 of the reactor vessel 12 via an auxillary exit port 75. Flow from the bottom plenum 13 of the reactor vessel 12 to the lower portion 15 of the satellite vessel 14 is through the same pathway 72 in reverse order.

The inner sleeve 62 has on its bottom surface a track (not shown) for receiving rollers 78 which are affixed to the bottom surface of the auxillary pathway 72 Alternatively, the rollers 78 may be affixed to the inner sleeve 62 and the track to the outer sleeve 68 or a combination thereof. As a result, the inner sleeve 62 can be moved along the rollers 78 into the satellite vessel 14 for a sufficient distance to thereby expose the bellows assembly 70 as described in detail hereinafter.

The inner sleeve 62 has an end portion 80 opening into the reactor vessel 12 and an opposed end portion 82 extending into the satellite vessel 14. The end portion 80 includes the exit port 64 having a rim 86 for mating with the corresponding reactor core inlet plenum sleeve 88 as shown in FIG. 1 to provide a continuous pathway for the flow of cool pressurized sodium from the cold leg connecting means 26 into the reactor core 16.

The end portion 82 of the inner sleeve 62 opening into the satellite vessel 14 includes a diffuser section 90 and a flow inductor section 92 which has an opening of sufficient size to form a flow connection with the pump column sleeve 94 located at the bottom pump column 22. Cool, pressurized, sodium from the pump column 22 flows via the pump column sleeve 94 into and through the flow inductor section 92 and diffuser section 90 of the inner sleeve 62 and eventually into the reactor core 16 through the reactor core inlet plenum sleeve 88.

The flow inductor section 92 of the inner sleeve 62 has a plurality of inlet holes 96 through which cold sodium is drawn into the inner sleeve 62 by the low pressure created by the flow inductor section 92 and the diffuser section 90 during operation of the pump column 22.

The cold leg connecting means is surrounded by the guard vessel 54 as described previously for the hot leg connecting means 24. The guard vessel 54 provides a barrier between the radioactive liquid sodium and the environment outside of the nuclear reactor 10. In a preferred form of the nuclear reactor 10 of the present invention, the guard vessel 54 extends about the entire facility so that leakage of radioactive liquids (e.g. liquid sodium) and gases may be detected and contained.

Figure 3:
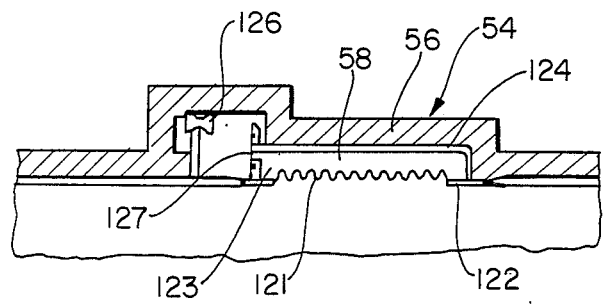
FIG. 3 is a partial perspective view showing a portion of the guard vessel and the bellows assembly associated therewith.

Referring to FIG. 3, the guard vessel 54 includes a guard pipe 56 which contains an inert gas such as argon and may contain an insulation layer 55 as described previously (FIG. 2). In the area surrounding the hot leg 24 and cold leg 26 connecting means, the guard vessel 54 also includes at least one ASME Section III Class II bellows assembly 58. Preferably at least two such bellows assemblies 58 are provided in order to accomodate vertical and lateral movement of the reactor vessel 12 and satellite vessel 14. The bellows assembly 58 includes a single sinusoidal shaped thin metal sheet 121 which expands or contracts in response to changes in temperature or force. The ends of the sheet 121 are attached and suspended by a substantially rigid frame 122.

The guard vessel bellows assembly 58 should be tested to assume its leakage integrity after installation. This is accomplished by forming an air tight space 123 above the bellows metal sheet 121. To do this, a collar 124, permanently affixed to the guard pipe 56 is engaged by an annular ring 126 to seal an opening 127 leading to the metal sheet 121. The pressure within the thus formed air tight space 123 is measured to determine if there is any leakage in the bellows assembly 58.

Referring to FIG. 2, the double bellows assembly 34 used for the hot leg connecting means 24 (ASME Section III, Class I) is the same as that employed for the cold leg connecting means 26 (see FIG. 1, numeral 70) and includes adjacent pairs of sinusoidal shaped thin metal sheets 106 which expand or contract in response to changes in temperature or force. The ends of each metal sheet 106 are attached to a substantially rigid frame 108.

Formed between each metal sheet 106 of the pairs of metal sheets is a chamber 110 which contains an inert gas such as argon. Above the topmost metal sheets 106 is a cavity 114 connected via outlet 74 to the chamber 53 containing stagnant sodium.

In a preferred embodiment, the pressure of the inert gas in the chamber 110 is monitored with a pressure gauge connection 116 attached to one end of the chamber 110 in a known manner. At the opposed end of the bellows assembly 34 there may be provided means for monitoring the expansion and contraction of the bellows assembly. For example, as shown in FIG. 3, a magnet 118 is attached at one end to the frame 108 and at the other end to a sensor 120 which creates a electrical pulse in response to the movement of the magnet 118 which movement may be detected in a known manner.

Referring to FIG. 4, the hot leg 24 and cold leg 26 connecting means are each provided with a sealing means 52 to shut off the flow of hot sodium from the reactor vessel 12 and the flow of cool sodium to the reactor vessel 12 when it is desirable to repair or replace the bellows assemblies 34, 70, respectively. The sealing means 52 includes a cover 130 having a rim 132 which mates with the rim 44 of the hot leg entry port 42 or the rim 86 of the cold leg exit port 64 to thereby form a seal which terminates the flow of sodium. Residual sodium remaining in the hot leg 24 or the cold leg 26 connecting means is removed by first draining the satellite vessel of sodium through a pump (not shown) and then opening a local drain line (not shown) in the bottom portion of each double bellows assembly 34, 70 to thereby remove sodium prior to work being performed on the bellows assemblies 34, 70.

When not in use the cover 130 is affixed to a wall of the reactor vessel 12 by a latch bolt 134 or other suitable releasable retaining means. When the cover 130 is moved to the closed position thereby terminating the flow of sodium, it is secured in place by a closure fitting 136 (e.g. a grayloc closure fitting) to provide a tight seal. The cover 130 is rotated from the open position wherein it is retained by the latch bolt 134 attached to the wall of the reactor vessel 12 to the closed position by rotation about a hinge means 137.

As a means of insuring against sodium leakage in the vicinity of the sealing means 52 when the cover 130 is in the closed position, there is provided an auxillary cooling means 50 for cooling sodium to below its melting point.

Referring to FIG. 4A, a metal gasket 138 is positioned at the junction between the cover 130 when it is in the closed position and the housing 38. To prevent leakage past the edges of the metal gasket 138, there is provided within the housing 38, a coolant containing chamber 140. The coolant chamber is located sufficiently close to the gasket 138 so that the coolant reduces the temperature of the sodium in the vicinity of the gasket 138 to below the melting point of sodium. As a result a solid clog is formed of any sodium trying to leak past the metal gasket 138. The coolant (e.g. a liquid sodium-potassium alloy or the like) is transmitted to the chamber 140 through a tube 142 from a coolant storage facility (not shown).

Figure 7A:
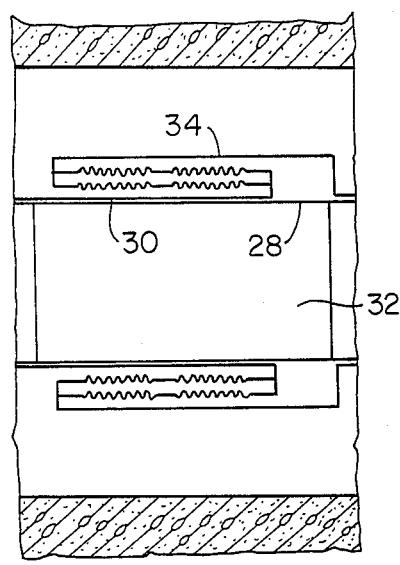
FIGS. 7A–7E are diagramatic views showing in sequence the removal of a bellows assembly and reinsertion of a new or repaired bellows assembly.
Figure 7B:
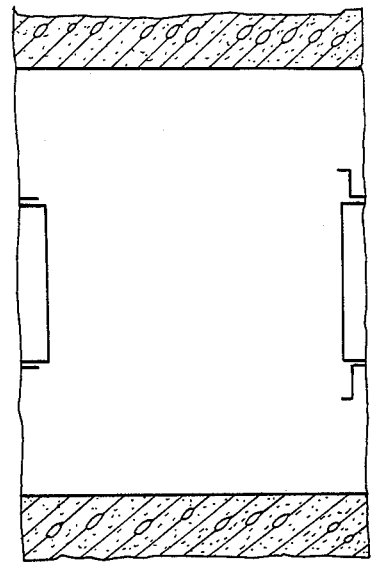

The operation of removing the bellows assemblies 34, 70 for repair or replacement will now be described. Referring to FIGS. 5 and 7A–7E, after the hot leg connecting means 24 has been sealed off by the cover 130 as described previously and the sodium contained therein has been drained, the guard pipe 56 is cut and removed as shown in FIG. 7A. Next, as shown in FIG. 7B, the ends of the frame 108 of the bellows assembly 34 are cut and a portion of the inner sleeve 28 proximate to the bellows assembly 34 is also cut and removed.

Figure 7C:
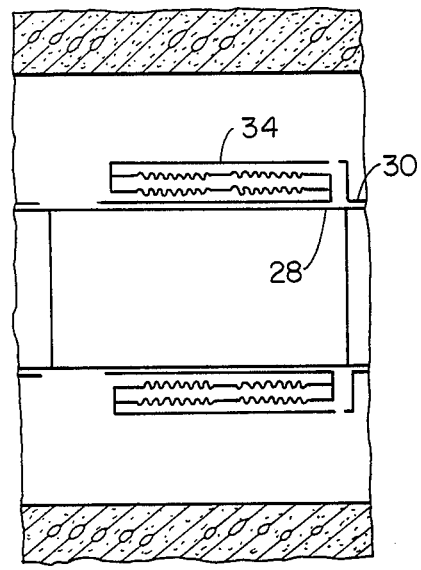
Figure 7D:
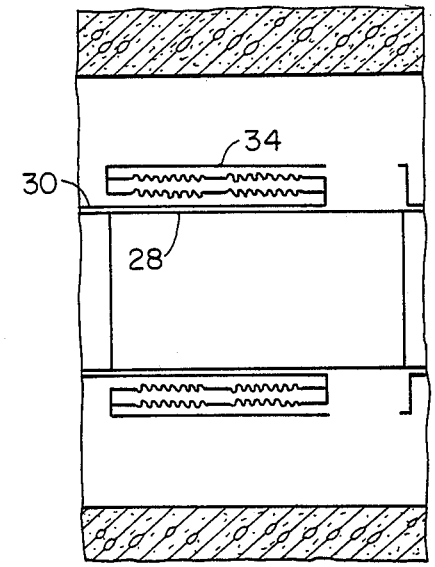
Figure 7E:
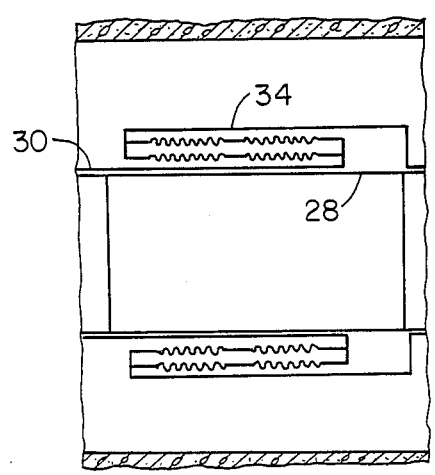

A new inner sleeve 28 is welded in place as shown in FIG. 7C and a new or repaired bellows assembly 34 is welded in place as shown in FIG. 7D. Thereafter, the outer sleeve 30 is reinserted and welded to complete the assembly as shown in FIG. 7E. The guard pipe 56 is then reinstalled.

Replacement or repair of the bellows assembly 70 of the cold leg connecting means 26 is performed in substantially the same way except that the inner sleeve 62 is moved away from the bellows assembly 70 into the bottom portion 15 of the satellite vessel 14. Therefore, the inner sleeve 62 is not cut to replace the bellows assembly 70 as shown specifically in FIG. 5.

Access to the bellows assembly is accomplished by moving the inner sleeve 62 on the rollers 78 which are fixed to the bottom surface of the outer sleeve 68. The inner sleeve 62 has at its bottom surface a track (not shown) which is slidable over the rollers 78.

Before the inner sleeve 62 is thus moved, the pump column 22 is lifted by a motor (not shown) to provide head room for the inner sleeve 62 within the satellite vessel 14 and the satellite vessel 14 is drained of sodium. The inner sleeve 62 is moved by a gear assembly 144 located at the base of the steam generator or heat exchanger 20 in the satellite vessel 14.

In a preferred form of the invention, the diffuser section 90 of the inner sleeve 62 may be equipped with a wheel and axle assembly 146 that rolls within a track 148 in the satellite vessel 14 to provide additional support for the inner sleeve 62 during repair or replacement of the bellows assembly 70.

The bellows assembly 58 employed for the guard vessel 54 may be accessed and removed in the same manner described above for the bellows assemblies 34, 70 of the hot leg 24 and cold leg 26 connecting means, respectively.

Access to the hot leg 24 and cold leg 26 connecting means for repair and replacement of the bellows assemblies 34, 70 is made through tunnels which are preferably constructed in the initial phases of the nuclear reactor facility 10.

Referring to FIG. 6, the reactor vessel 12 is connected to at least one satellite vessel 14 via the hot leg connecting means 24 and the cold leg connecting means 26 (not shown) lying below and parallel to the hot leg connecting means 24. A primary tunnel 150 provides access to the hot leg and cold leg connecting means 24 and 26 and an secondary tunnel 152 provides access to the primary tunnel 150 for personnel and equipment to reach the bellows assemblies 34, 70 for repair and replacement.

As previously indicated, in accordance with the present invention, more than one satellite vessel may be linked to a single reactor vessel. It is desirable to provide for the connection of multiple satellite vessels during the initial construction of the nuclear reactor even though one or more satellite vessels will not initially be operational. This is accomplished by constructing the reactor vessel with openings containing partially constructed components of the hot leg and cold leg connecting means for each satellite vessel installation and then sealing off the openings until the additional satellite vessels are added.

Referring to FIG. 1, the openings 160 and 162 for the hot leg and cold leg connecting means, respectively are provided in the reactor vessel 12 for later connection to as yet unbuilt or non-operational satellite vessels.

The opening 160 contains a partially constructed guard vessel 164, outer sleeve 166 and inner sleeve 168. Each of these partially constructed components are sealed by covers 170, 172 and 174, respectively at the end of the opening 160 remote from the reactor vessel 12. The other end of the opening 160 which extends into the reactor vessel 12 includes an entry port 176 having a rim 178 as described previously for the inner sleeve 28 of the operational hot leg connecting means 24. The partial inner sleeve 168 is securely fastened to the wall of the reactor vessel 12 by housing 180 and shroud support 182. The removable cover 130 described previously is secured over the entry port 176 to provide a seal preventing the hot sodium with the reactor vessel 12 from entering therein.

When an additional satellite vessel is constructed, the covers 170, 172 and 174 are removed and the partial guard vessel 164, outer sleeve 166 and inner sleeve 168 are completed by welding the remaining portions thereof to provide a pathway for the flow of hot sodium therethrough when the removable cover 130 is placed in the open position by attachment to the wall of the reactor vessel 12.

The reactor vessel 12 also contains a corresponding opening 162 for eventually housing an operational cold leg connecting means 26. Within the opening 162 is a partially constructed guard vessel 184 and an outer sleeve 186 which are sealed off by covers 188 and 190, respectively and at the opposed end thereof by a cover 130. Preferably, an inner sleeve is not inserted into the cold leg connecting means until the additional satellite vessel is constructed and ready to be operational.

It is also desirable to construct a corresponding reactor core inlet plenum 88 for eventually mating with the inner sleeve. Of course, until the inner sleeve is inserted into the opening 162 and the satellite vessel is operational, the reactor core inlet plenum 88 is sealed by a cover 192 as shown in FIG. 1.

What we claim is:

1. A nuclear reactor comprising:
   (a) a reactor vessel containing a reactor core and means for employing a liquid metal for absorbing heat generated within the reactor core and an inlet entering the reactor core for receiving cool liquid metal;
   (b) at least one receiver vessel for receiving the hot liquid metal from the reactor vessel, the receiver vessel containing means for removing heat from the hot liquid metal produced in the reactor vessel to thereby form cool liquid metal;
   (c) a hot leg connecting means removably connected to the reactor vessel and the at least one reveiver vessel providing a pathway for the flow of the hot liquid metal from the reactor vessel to the at least one receiver vessel, the hot leg connecting means comprising;
   (1) an inner sleeve providing a pathway for the flow of the hot liquid metal from the reactor vessel and having a first end opening into the reactor vessel and a second end opening into the at least one receiver vessel,
   (2) an outer sleeve substantially circumscribing the inner sleeve and including a first bellows assembly,
   (3) a chamber between the inner sleeve and the outer sleeve said chamber containing stagnant liquid metal, and
   (4) a movable cover mounted at the first end opening, said cover being movable from an open position permitting the flow of the hot liquid metal to a closed position sealing off the first end and thereby terminating the flow of the hot liquid metal,
   (d) a cold leg connecting means removably connected to the reactor vessel and the at least one receiver vessel and providing a pathway for the flow of cool liquid metal from the at least one receiver vessel to the reactor vessel, the cold leg connecting means comprising;
   (1) an inner sleeve providing a pathway for the flow of the cool liquid metal and having a first end opening into the at least one receiver vessel and a second end opening into the reactor vessel, and means operably connected to the inner sleeve enabling the inner sleeve to be moved from a first position within the cold leg connecting means to a second position within the at least one receiver vessel,
   (2) an outer sleeve circumscribing at least a major portion of the inner sleeve and including a second bellows assembly, the second bellows bellows assembly being exposed when the inner sleeve is moved from the first position to the second position, and
   (3) a movable cover mounted at the second end opening, said cover being movable from an open position permitting the flow of the cool liquid metal to a closed position sealing off the second end and thereby terminating the flow of the liquid metal, and
   (e) means for providing access to the first and second bellows assembly to provide for removal and replacement of any one of the first and second bellows assembly.

2. The nuclear reactor of claim 1 wherein said receiver vessel is selected from a satellite vessel, a heat exchanger, a steam generator, a pump or a combination thereof.

3. The nuclear reactor of claim 1 further comprising pressure means for directing the flow of cool liquid metal from the receiver vessel into the cold leg connecting means.

4. The nuclear reactor of claim 1, wherein the first and second bellows assembly comprises means for monitoring the expansion and contraction of the first and second bellows assembly.

5. The nuclear reactor of claim 1, wherein the liquid metal is liquid sodium.

6. The nuclear reactor of claim 1, wherein the cold leg connecting means further comprises an auxillary pathway between the inner sleeve and the outer sleeve, the auxillary pathway having a first end opening into the receiver vessel for receiving the cool liquid metal from the receiver vessel and a second end for supplying the cool liquid metal to the reactor vessel.

7. The nuclear reactor of claim 1, wherein the access means to the first and second bellows assembly comprises a pair of tunnels substantially parallel to the first and second bellows assembly and a third tunnel connected to the first and second tunnels, each of said tunnels being of sufficient size to enable the repair or replacement of any one of the first and second bellows assembly.

8. The nuclear reactor of claim 1, wherein the inlet is removably connected to the second end of the inner sleeve of the cold leg connecting means to provide a pathway for the flow of the cool liquid metal from the cold leg connecting means to the reactor core.

9. The nuclear reactor of claim 1, wherein the means for removing heat from the hot liquid metal is selected from the heat exchanger or a steam generator.

10. The nuclear reactor of claim 1 further comprising means for maintaining the first bellows assembly bellow about 800° F.

11. The nuclear reactor of claim 1, wherein the hot leg connecting means further comprises means for solidifying the hot liquid metal at the juncture of the movable cover and the first end of the inner sleeve when the movable cover is in the closed position.

12. The nuclear reactor of claim 11, wherein the means for solidifying the hot liquid metal comprises a coolant containing chamber in proximity to the juncture, a source of coolant and a connection means between the source of the coolant and the chamber, providing a pathway for the flow of the coolant to the juncture, whereby the coolant reduces the temperature of the liquid metal at the juncture to below its melting point to thereby form a solid clog of the metal.

13. The nuculear reactor of claim 1, wherein the reactor vessel further comprises means for protecting the hot leg connecting means from thermal transients in the vicinity of the first end.

14. The nuclear reactor of claim 13 wherein the means for protecting the hot leg connecting means further comprises a housing and a shroud support mounted around the first end and affixed to a wall of the reactor vessel, the housing and shroud support providing a permanent attachment of the first end to the reactor vessel.

15. The nuclear reactor of claim 1 further comprising means within the reactor vessel for linking the reactor core of the reactor vessel with at least one additional receiver vessel.

16. The nuclear reactor of claim 15, wherein the linking means comprises at least one pair of openings in the wall of the reactor vessel, said pair of openings housing at least a portion of the components comprising the hot leg connecting means and cold leg connecting means, respectively and removable covers protecting said components from the liquid metal contained in said reactor vessel.

17. the nuclear reactor of claim 1 further comprising a guard vessel substantially circumscribing the outer sleeve of the hot leg and the cold leg connecting means, the guard vessel for each of the outer sleeves comprising at least two bellows assemblies, a guard pipe containing an inert gas, and means for controlling the temperature of the guard vessel.

18. The nuclear reactor of claim 17 wherein the guard vessel further comprises means for testing the bellows for leaks which comprises a bar affixed to the undersurface of the guard pipe and an annular collar removably connected to the bar to thereby form an air tight space in the bellows, and means for detecting pressure within the air tight space.

19. The nuclear reactor of claim 17 wherein the guard pipe has a layer of insulation at least on the top surface thereof.

20. the nuclear reactor of claim 1, wherein the pressure means is a pump having a pump sleeve removably connected to the inner sleeve of the cold leg connecting means.

21. The nuclear reactor of claim 20, wherein the pump sleeve is connected at one end to the pump means and is removably connected at another end to the inductor section of the inner sleeve of the cold leg connecting means.

22. The nuclear reactor of claim 20, wherein the cold leg connecting means further comprises a plurality of rollers and a roller receiving track, wherein the rollers are aligned with and movable in the track to thereby enable the inner sleeve to be moved from the first position within the cold leg connecting means to the second position within the receiver vessel.

23. The nuclear reactor of claim 22, wherein the inner sleeve of the cold leg connecting means further comprises, a substantially cylindrical major section, an inductor section at the first end of the cylindrical major section, the inductor section including an opening removably connected to the pump sleeve in the receiver vessel and having a plurality of inlet holes for the uptake of cool liquid metal from the receiver vessel, and a diffuser section connected at one end to the inductor section and at an opposed end to the major section of the inner sleeve, wherein the pump directs the cool liquid metal from the receiver vessel through the inner sleeve of the cold leg connecting means into the reactor vessel.

24. The nuclear reactor of claim 23, wherein the inner sleeve of the cold leg connecting means further comprises at least one pair of second rollers affixed to the exterior surface of the diffuser section of the inner sleeve, and the receiver vessel having a second track for receiving the second rollers, wherein the second rollers move in the second track when the inner sleeve of the cold leg connecting means is moved from the first position to the second position within the receiver vessel.

* * * * *